United States Patent
Miao (10) Patent No.: US 11,871,158 B2
(45) Date of Patent: Jan. 9, 2024

(54) PROJECTION SYSTEM AND OPERATION METHOD THEREOF

(71) Applicant: Coretronic Corporation, Hsin-Chu (TW)

(72) Inventor: Yun-Lin Miao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/841,691

(22) Filed: Jun. 16, 2022

(65) Prior Publication Data

US 2022/0417477 A1 Dec. 29, 2022

(30) Foreign Application Priority Data

Jun. 29, 2021 (CN) .......................... 202110725125.0

(51) Int. Cl.
*G03B 21/14* (2006.01)
*H04N 9/31* (2006.01)
*H04N 5/268* (2006.01)

(52) U.S. Cl.
CPC ........... *H04N 9/3147* (2013.01); *H04N 5/268* (2013.01)

(58) Field of Classification Search
CPC .... H04N 9/3147; H04N 5/268; G06F 3/1423; G03B 21/14
See application file for complete search history.

(56) References Cited

U.S. PATENT DOCUMENTS

2019/0116342 A1* 4/2019 Sakai .................... H04N 9/3147
2020/0267358 A1* 8/2020 Huang .................... G08C 17/02

FOREIGN PATENT DOCUMENTS

TW 200951899 12/2009
TW 201024133 7/2010
TW 201710113 3/2017

\* cited by examiner

*Primary Examiner* — Ryan D Howard
(74) *Attorney, Agent, or Firm* — JCIPRNET (57) ABSTRACT

The invention relates to a projection system and an operation method thereof. The projection system includes multiple projection devices and a central control platform. The central control platform is coupled to the projection devices. The central control platform delivers a data signal and a selection signal to the projection devices. The projection devices generate a decoding result according to the selection signal. At least one projection device is selected from the projection devices to receive the data signal according to the decoding result. The at least one projection device selected from the projection devices generates a projection image corresponding to the data signal. In the invention, one or more projection devices are selected as selected projection devices through signal features of the selection signal, thereby realizing a one-to-many communication mechanism for controlling the projection devices.

16 Claims, 4 Drawing Sheets

PROJECTION SYSTEM AND OPERATION METHOD THEREOF

CROSS-REFERENCE TO RELATED APPLICATION

This application claims the priority benefit of China application serial no. 202110725125.0, filed on Jun. 29, 2021. The entirety of the above-mentioned patent application is hereby incorporated by reference herein and made a part of this specification.

BACKGROUND

Technical Field

The invention relates to a projection system, and in particular to a projection system having multiple projection devices and an operation method thereof.

Description of Related Art

Projection systems with multiple projection devices are used in a variety of technical fields. For example, a projection system with multiple projection devices can be applied to vehicles. In an in-car system, multiple projection devices may be used as car display systems, welcome lights, trademark lights, illuminating lights, and/or other projection applications in a car. However, projection devices with predisposed fixed projection data are used in existing multi-projection systems. For the projection devices with predisposed fixed projection data, such as welcome lights, trademark lights, illuminating lights, etc., a central control platform controls the projection devices to be turned on and off through a power supply interface, and the central control platform cannot modify the projection content. Alternatively, the central control platform respectively controls multiple projection devices through multiple dedicated signal paths (one projection device uses one dedicated signal path), and such a one-to-one communication mechanism requires a substantial amount of circuit disposition and cost.

This "background technology" part is only used to help understand the content of the invention, so the content disclosed in the "background technology" part may contain some conventional technologies that do not constitute the ordinary skill in the technical field. The content disclosed in the "Background Technology" section does not represent the content or the problem to be solved by the invention or a plurality of embodiments, which was known or recognized by those of ordinary skill in the relevant technical field before the invention was applied for.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention proposes a projection system and an operation method of the projection system, which control multiple projection devices by using a one-to-many communication mechanism.

Other objectives and advantages of the invention can be further understood from the technical features disclosed in the invention.

In order to achieve one or part or all of the above objectives or other objectives, an embodiment of the invention proposes a projection system including multiple projection devices and a central control platform. The central control platform is coupled to the projection devices. The central control platform delivers a data signal and a selection signal to the projection devices. The projection devices generate a decoding result according to the selection signal. At least one projection device is selected from the projection devices to receive the data signal according to the decoding result, so that the at least one projection device that is selected from the projection devices generates a projection image corresponding to the data signal.

In order to achieve one or part or all of the above objectives or other objectives, an embodiment of the invention proposes an operation method of a projection system. The projection system includes multiple projection devices and a central control platform coupled to the projection devices. The operation method includes the following. The central control platform delivers a data signal and a selection signal to the projection devices. The projection devices generate a decoding result according to the selection signal. At least one projection device is selected from the projection devices to receive the data signal according to the decoding result, so that the at least one projection device in the projection devices generates a projection image corresponding to the data signal.

Based on the above, the embodiments of the invention at least have one of the following advantages or efficacies. In the projection system described in the embodiments of the invention, the data signal and the selection signal are delivered to the projection devices at the same time through the data signal path and the selection signal path by the central control platform. The projection devices generate the decoding result according to the selection signal. According to the decoding result, at least one projection device is selected from the projection devices to receive the data signal, so that the projection device that is selected generates the projection image corresponding to the data signal. In this way, the central control platform controls the projection devices by using the one-to-many communication mechanism.

To provide a further understanding of the above features and advantages of the invention, embodiments accompanied with drawings are described below in details.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected, "coupled," and "mounted," and variations thereof herein are used broadly and encompass direct and indirect connections, couplings, and mountings.

The foregoing and other technical content, features and effects of the invention will be clearly presented in the detailed description of the exemplary embodiments with the accompanying drawings below. The directional terms mentioned in the following embodiments, such as: up, down, left, right, front or back, etc., only refer to the directions with reference to the drawings. Therefore, the directional terms are used to illustrate but not to limit the invention.

Multiple embodiments are presented below to illustrate the invention, but the invention is not limited to the embodiments illustrated. Appropriate combinations are also allowed between embodiments. The term "coupled (or connected)" used in the full text of the description (including the claims) of the invention may refer to any direct or indirect connection methods. For example, if the text describes that a first device is coupled (or connected) to a second device, it should be interpreted as that the first device may be directly connected to the second device, or the first device may be indirectly connected to the second device through other devices or a certain connection method. In addition, wherever possible, elements/components/steps with a same reference symbol in the drawings and embodiments represent a same or similar part. Elements/components/steps that use the same symbol or use the same term in different embodiments may have related instructions to be referred to. In addition, the term "signal" may refer to at least one current, voltage, charge, temperature, piece of data, electromagnetic wave, or any other one or more signals.

Figure 1:
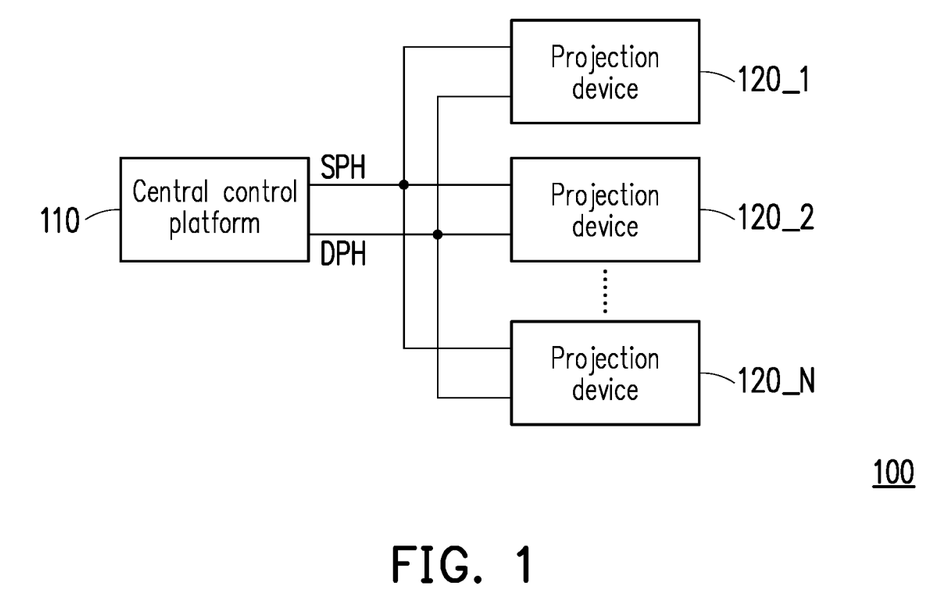
FIG. 1 is a schematic diagram of a circuit block of a projection system according to an embodiment of the invention.

FIG. 1 is a schematic diagram of a circuit block of a projection system 100 according to an embodiment of the invention. In the embodiment shown in FIG. 1, the projection system 100 includes a central control platform 110 and projection devices 120_1, 120_2, . . . , 120_N. The central control platform 110 is coupled to the projection devices 120_1 to 120_N through a data signal path DPH and a selection signal path SPH. According to actual design, in some embodiments, the projection devices 120_1 to 120_N may be, for example, mini-projectors or other types of projection devices. The number N of the projection devices 120_1 to 120_N may be determined according to the actual design/application, and is not limited by this embodiment.

According to design requirements, the projection system 100 may be applied in a variety of technical fields. For example, when applied to a vehicle, such as a car, the central control platform 110 may be an on-board computer to receive vehicle information or instructions input by a user. For example, the user may set specific display content for the projection devices 120_1 to 120_N, respectively, such as a selected pattern or a selected video, through an in-vehicle touch screen. Alternatively, the user may select both the pattern and the video as the display content at the same time. The projection devices 120_1 to 120_N may be respectively installed in different positions inside and outside the car, such as at the driver's seat, the front passenger's seat, the left rear seat, the right rear seat or the door outside the car, the roof, the left side of the car, the right side of the car, a position in front of or behind the car, and projections may be respectively performed according to the display content specified by the user.

In this embodiment, the central control platform 110 may deliver a selection signal to the projection devices 120_1 to 120_N through the selection signal path SPH. According to design requirements, the selection signal path SPH may include a conductive wire, a Controller Area Network (CAN) bus, a Local Interconnect Network (LIN) bus, a Universal Asynchronous Receiver/Transmitter, UART) or one of other types of transmission paths or a combination thereof, and is not limited by this embodiment.

In this embodiment, the central control platform 110 may deliver a data signal DT to the projection devices 120_1 to 120_N through the data signal path DPH. The data signal DT may, for example, include image content (such as video streams), projection device control parameters, and/or other data. Among the above, the projection device control parameters may include, for example, a control parameter used to switch between different cross-arrangements of different video content (such as video streams or pictures), a control parameter of loop playback, a control parameter used to adjust the number or time of projections, a control parameter used to turn on and off the projection devices 120_1 to 120_N, a control parameter used to perform a firmware update, a control parameter used to update the image content, and/or other control parameters. According to design requirements, the data signal path DPH may include a power line, a CAN bus, a LIN bus or a UART bus, or one of other types of transmission paths or a combination thereof, and is not limited by this embodiment. For example, in some embodiments, the data signal path DPH may include both a power line and a LIN bus (or other combinations) to deliver image content (such as video streams or static pictures) via the power line and deliver projection device control parameters via a LIN bus.

Figure 2:
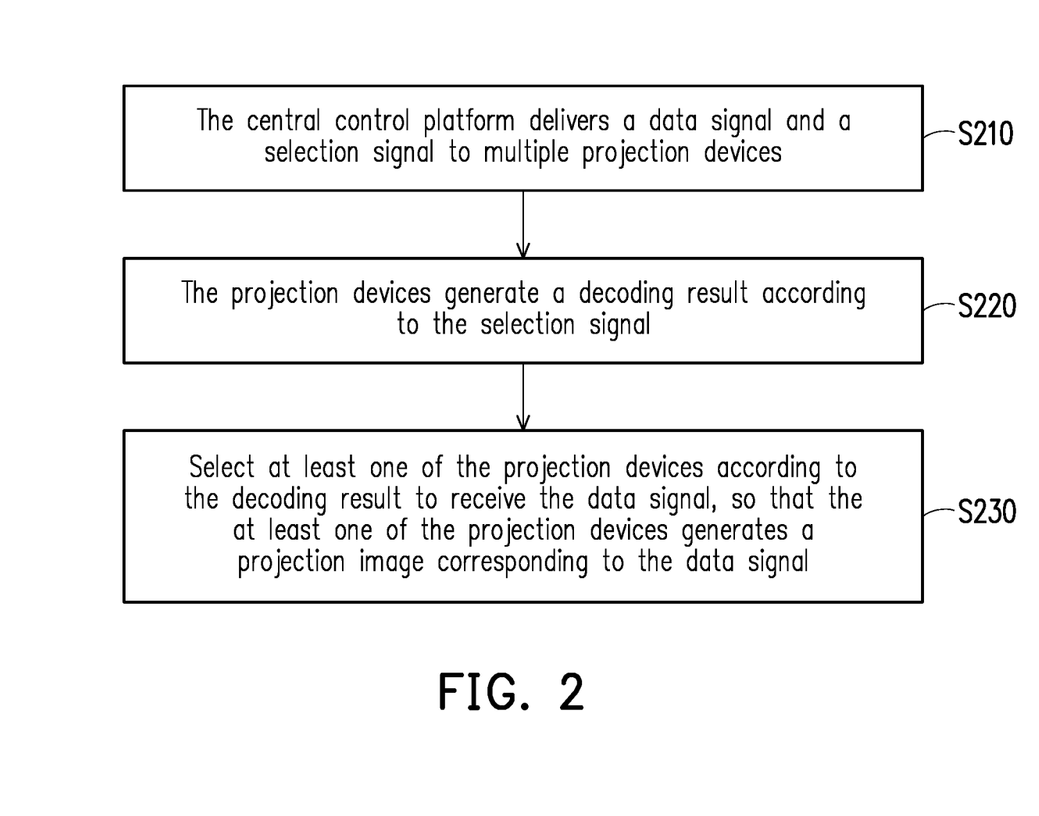
FIG. 2 is a schematic flow chart of an operation method of a projection system according to an embodiment of the invention.

FIG. 2 is a schematic flow chart of an operation method of a projection system according to an embodiment of the invention. Related descriptions of FIG. 2 may be referred to for the projection system 100 shown in FIG. 1, a projection system 300 shown in FIG. 3, and/or a projection system 400 shown in FIG. 4. Referring to FIGS. 1 and 2, in step S210, the central control platform 110 may deliver the data signal DT to the projection devices 120_1 to 120_N through the data signal path DPH, and the central control platform 110 may deliver a selection signal to the projection devices 120_1 to 120_N through the selection signal path SPH. In step S220, the projection devices 120_1 to 120_N may generate a decoding result according to the selection signal of the selection signal path SPH. In step S230, at least one projection device is selected from the projection devices 120_1 to 120_N according to the decoding result to receive and process the data signal DT delivered by the data signal path DPH. The other unselected projection devices among the projection devices 120_1 to 120_N may ignore the data signal DT delivered by the data signal path DPH. The selected at least one of the projection devices 120_1 to 120_N may generate a projection image corresponding to the data signal DT of the data signal path DPH.

In this way, the central control platform 110 may select at least one projection device from the projection devices 120_1 to 120_N according to the selection signal of the selection signal path SPH, and transmit the data signal DT through the data signal path DPH to the selected projection device to perform projection. Therefore, the projection system 100 may realize the communication mechanism of "one central control platform 110 selectively communicating with the plurality of projection devices 120_1 to 120_N through the same data signal path DPH", thereby reducing a substantial amount of circuit disposition which takes up space and a substantial amount of cost required by a one-to-one communication mechanism.

Figure 3:
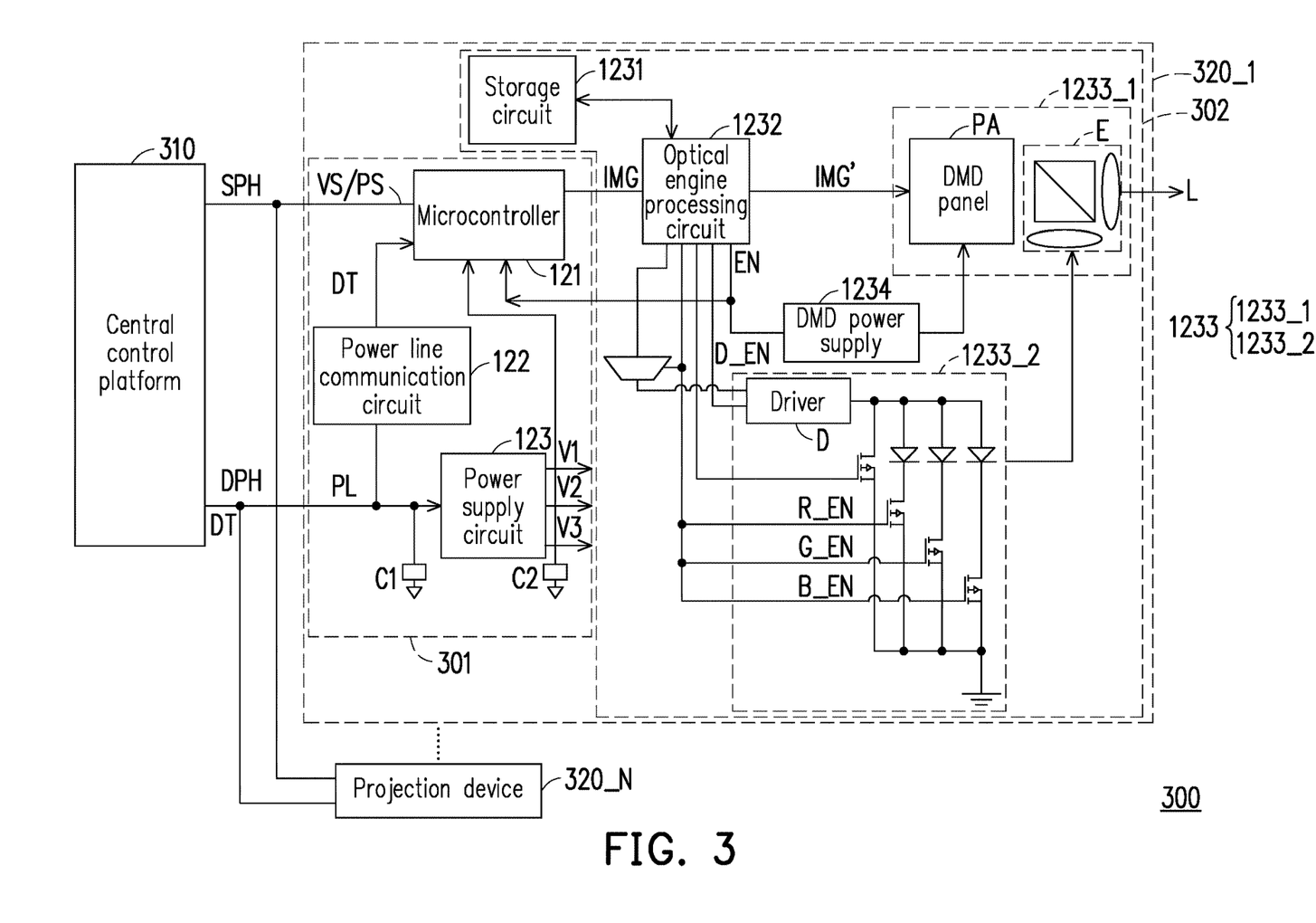
FIG. 3 is a schematic diagram of a circuit block of a projection system according to another embodiment of the invention.

FIG. 3 is a schematic diagram of a circuit block of the projection system 300 according to another embodiment of the invention. In the embodiment shown in FIG. 3, the projection system 300 includes a central control platform 310 and projection devices 320_1, . . . , 320_N. The central control platform 310 may deliver the data signal DT to the projection devices 320_1 to 320_N through the data signal path DPH, and the central control platform 310 may deliver a selection signal to the projection devices 320_1 to 320_N through the selection signal path SPH. The central control platform 310, the projection devices 320_1 to 320_N, the data signal path DPH, and the selection signal path SPH shown in FIG. 3 may be deduced with reference to the related descriptions of the central control platform 110, the projection devices 120_1 to 120_N, the data signal path DPH, and the selection signal path SPH shown in FIG. 1. In the embodiment shown in FIG. 3, the projection devices 320_1 to 320_N may have a same structure or similar structures. For the convenience of description, the projection device 320_1 is taken as an example for illustration. Other projection devices of the projection system 300 may be deduced with reference to the relevant description of the projection device 320_1.

In this embodiment, the projection device 320_1 includes a processing circuit 301 and an optical engine module 302. The processing circuit 301 is coupled to the data signal path DPH and the selection signal path SPH. The optical engine module 302 is coupled to the processing circuit 301. When the central control platform 310 selects at least one of the projection devices 320_1 to 320_N according to the selection signal of the selection signal path SPH, a processing circuit (for example, the processing circuit 301 of the projection device 320_1) of the at least one projection device selected from the projection devices 320_1 to 320_N may generate at least one image frame according to the data signal DT of the data signal path DPH. The optical engine module 302 may generate a projection image according to the at least one image frame of the processing circuit 301.

Specifically, in this embodiment, the processing circuit 301 may include a microcontroller 121. The microcontroller 121 may generate a decoding result according to the selection signal on the selection signal path SPH, and determine whether the central control platform 310 has selected the projection device 320_1 according to the decoding result. When the decoding result indicates that the projection device 320_1 is selected by the central control platform 310, the microcontroller 121 may generate at least one image frame IMG according to the data signal DT delivered by the data signal path DPH. The optical engine module 302 may display an image L according to the at least one image frame IMG output by the microcontroller 121.

In the embodiment shown in FIG. 3, the selection signal path SPH may include a conductive wire to deliver the selection signal, and the selection signal may be a digital signal, an analog voltage VS, or a pulse signal PS. For example, in some embodiments, the central control platform 310 may deliver the analog voltage VS through the conductive wire in the selection signal path SPH. The analog voltage VS may be defined as a plurality of voltage levels according to a voltage range of the conductive wire and the number N of the projection devices 320_1 to 320_N to correspond to the projection devices 320_1 to 320_N. For example, assuming that the voltage range of the conductive wire is 0 to 12 volts, and the number N of projection devices 320_1-320_N is 9, it may be defined that when the analog voltage VS is 12, 10.5, 9, 7.5, 6, 4.5, 3, 1.5, and 0 volts, respectively, the analog voltage VS respectively corresponds to one of the projection devices 320_1 to 320_9. For example, when the level of the analog voltage VS is 12 volts, the projection device 320_1 is the selected projection device, and when the level of the analog voltage VS is 0 volts, the projection device 320_9 is the selected projection device. In some embodiments, the microcontroller 121 may have an Analog-to-Digital Converter (ADC) to determine whether the projection device 320_1 is selected by the central control platform 310 according to the analog voltage VS and a predefined threshold voltage.

As another example, the selection signal path SPH may include a plurality of conductive wires to respectively transmit a plurality of analog voltages VS to form different voltage combinations. For example, the following Table 1 is a code comparison table of the analog voltage VS and the projection devices 320_1 to 320_N.

TABLE 1

| Code comparison table of analog voltage VS and projection device | | |
| --- | --- | --- |
| Selected projection device | Analog voltage VS_1 | Analog voltage VS_2 |
| 320_1 | VT | VT |
| 320_2 | VT | GND |
| 320_3 | VT | VBAT |
| 320_4 | GND | VT |
| 320_5 | VBAT | VT |
| 320_6 | GND | GND |
| 320_7 | GND | VBAT |
| 320_8 | VBAT | GND |
| 320_9 | VBAT | VBAT |

In the embodiment shown in Table 1, the number N of projection devices 320_1 to 320_N is assumed to be 9; that is, the projection system 300 includes the projection device 320_1, the projection device 320_2, the projection device 320_3, the projection device 320_4, the projection device 320_5, the projection device 320_6, the projection device 320_7, the projection device 320_8, and the projection device 320_9. The left column shown in Table 1 represents the projection devices 320_1 to 320_9.

In the embodiment shown in Table 1, the analog voltage VS includes analog voltages VS_1 and VS_2. The middle and right columns shown in Table 1 represent the analog voltage VS_1 and the analog voltage VS_2. It is assumed here that a voltage range of the analog voltages VS_1 and VS_2 is between a first voltage GND and a second voltage VBAT, and a voltage value of the analog voltage VT is between the first voltage GND and the second voltage VBAT and is different from the first voltage GND and the second voltage VBAT. For example, according to design requirements, the first voltage GND may be 0 volts, the second voltage VBAT may be 12 volts, and the analog voltage VT may be 5 volts. In this way, the microcontroller 121 may determine whether the projection device 320_1 is selected by the central control platform 310 according to the analog voltage VS_1 and the analog voltage VS_2. The analog voltages VS_1 and VS_2, the number of projection devices 320_1 to 320_9, and voltage combinations thereof in Table 1 are just an example, and the invention is not limited thereto.

In the embodiment shown in FIG. 3, according to design requirements, the central control platform 310 may deliver the pulse signal PS through the conductive wire in the selection signal path SPH, and a pulse characteristic of the pulse signal PS, such as the number of pulses or a pulse width, may be used to correspond to at least one of the projection devices 320_1 to 320_N. For example, in some embodiments, the number of pulses of the pulse signal PS or a time length of the pulse width may be defined according to the number N of projection devices 320_1 to 320_N. For example (but not limited to), the pulse signal PS with one pulse may represent "selecting the projection device 320_1", the pulse signal PS with two pulses may represent "selecting the projection device 320_2", and the pulse signal PS with N pulses may represent "selecting the projection device 320_N". Alternatively, (but not limited to), the pulse signal PS with one pulse width per unit time may represent "selecting the projection device 320_1", the pulse signal PS with two pulse widths per unit time may represent "selecting the projection device 320_2", and the pulse signal PS with N pulse widths per unit time may represent "selecting the projection device 320_N". The time length may be associated with the working period of the microprocessor 121 or other frequency sources (not shown), for example. The microcontroller 121 may determine whether the projection device 320_1 is selected by the central control platform 310 according to the pulse signal PS.

In the embodiment shown in FIG. 3, the data signal path DPH may include a power line PL. Based on the Power Line Communication Protocol (PLC) technology, the central control platform 310 may deliver the data signal DT to the processing circuit 301 through the power line PL. The PLC technology refers to a communication method that uses the power line PL to transmit the data signal DT. In the PLC technology, a high frequency signal carrying the data signal DT may be loaded on a current and be transmitted through the power line PL, and then the high frequency signal may be separated from the current to realize information transmission. In this embodiment, the processing circuit 301 may further include a power line communication circuit 122. The power line communication circuit 122 may be coupled to the power line PL and the microcontroller 121. The power line communication circuit 122 may decode the data signal DT from the power line PL, and provide the data signal DT to the microcontroller 121. In this way, when the central control platform 310 selects the projection device 320_1 according to the selection signal of the selection signal path SPH, the microcontroller 121 may generate at least one image frame IMG according to the data signal DT output by the power line communication circuit 122 and transmit the at least one image frame IMG to the optical engine module 302. When the projection device 320_1 is not selected by the central control platform 310, the microcontroller 121 may ignore the data signal DT, so that the projection device 320_1 does not change the current projection content and/or the projection device control parameters.

In the embodiment shown in FIG. 3, according to design requirements, the processing circuit 301 may further includes a power supply circuit 123, a capacitance C1 and a capacitance C2. The power supply circuit 123 may receive a voltage signal from the central control platform 310 through the data signal path DPH (for example, the power line PL), and generate operating voltages V1 to V3 suitable for each element or module in the projection device 320_1 according to the voltage signal. In this embodiment, one of the operating voltages V1 to V3 may be used as the power supply of the microcontroller 121. In this embodiment, the capacitances C1 and C2 may be used as energy storage elements, and may be respectively disposed on the input terminal and output terminal of the power supply circuit 123. In other embodiment, the capacitances C1 and C2 may be disposed individually, and the capacitances C1 and C2 are not limited by this embodiment. In this embodiment, the capacitances C1 and C2 may be used to maintain the power supply voltage required for the microcontroller 121 to operate.

In the embodiment shown in FIG. 3, the optical engine module 302 may include a storage circuit 1231, an optical engine processing circuit 1232, an imaging device 1233, and a Digital Micromirror Device (DMD) power supply 1234. The storage circuit 1231 may store a plurality of pieces of candidate image information. The optical engine processing circuit 1232 may be coupled to the microcontroller 121 and the storage circuit 1231 to output image information IMG' according to at least one image frame IMG and/or a plurality of pieces of candidate image information. In this embodiment, the imaging device 1233 may include an imaging element 1233_1 and a light source 1233_2. The light source 1233_2 is used to filter light to generate different colors of light; for example, in this embodiment, the light source 1233_2 may filter the light into red, blue and green light. White light and yellow light may further be added in other embodiments, and the invention is not limited by this embodiment. The imaging element 1233_1 may be coupled to the optical engine processing circuit 1232 to project and form the display image L according to the image information IMG' and the light source 1233_2.

In this embodiment, according to design requirements, the imaging element 1233_1 may include a light valve PA and a light transmission module E. In this embodiment, the light valve PA is, for example, a Digital Micromirror Device, and the light transmission module E is, for example, at least one optical lens and a Total Reflection Prism (TIR). The optical engine processing circuit 1232 may generate an enable signal EN to enable the DMD power supply 1234, so that the DMD power supply 1234 may supply power to the light valve PA. In this embodiment, the light source 1233_2 may include a driver D and a plurality of switches. In some embodiments, the optical engine processing circuit 1232 may further generate enable signals D_EN to drive the driver D. In some embodiment, the optical engine processing circuit 1232 may further generate enable signals R_EN, G_EN, and B_EN to drive a plurality of switches, so that a red light source, a green light source, and a blue light source in the light source 1233_2 may emit light according to the enable signals R_EN, G_EN, and B_EN, respectively. These colored lights are transmitted to the light transmission module E and are driven by the driver D. Through the driver D and the light transmission module E, the colored lights are sequentially irradiated on the light valve PA, so that a micro-lens matrix formed by micro-lenses on the light valve PA reflects an image corresponding to these colored lights to the light transmission module E, thereby projecting an image. In addition, the light valve PA may control a flip angle of each micro lens according to the image information IMG' to correctly project the lights out to form the display image L.

In this way, when the central control platform 310 selects the projection device 320_1 through the selection signal path SPH to allow the microcontroller 121 to generate at least one image frame IMG, the optical engine module 302 may generate the display image L according to the at least one image frame IMG. When the central control platform 310 does not select the projection device 320_1, the optical engine module 302 may not change the current projection content and/or projection device control parameters according to a plurality of pieces of candidate image information stored in the storage circuit 1231.

Figure 4:
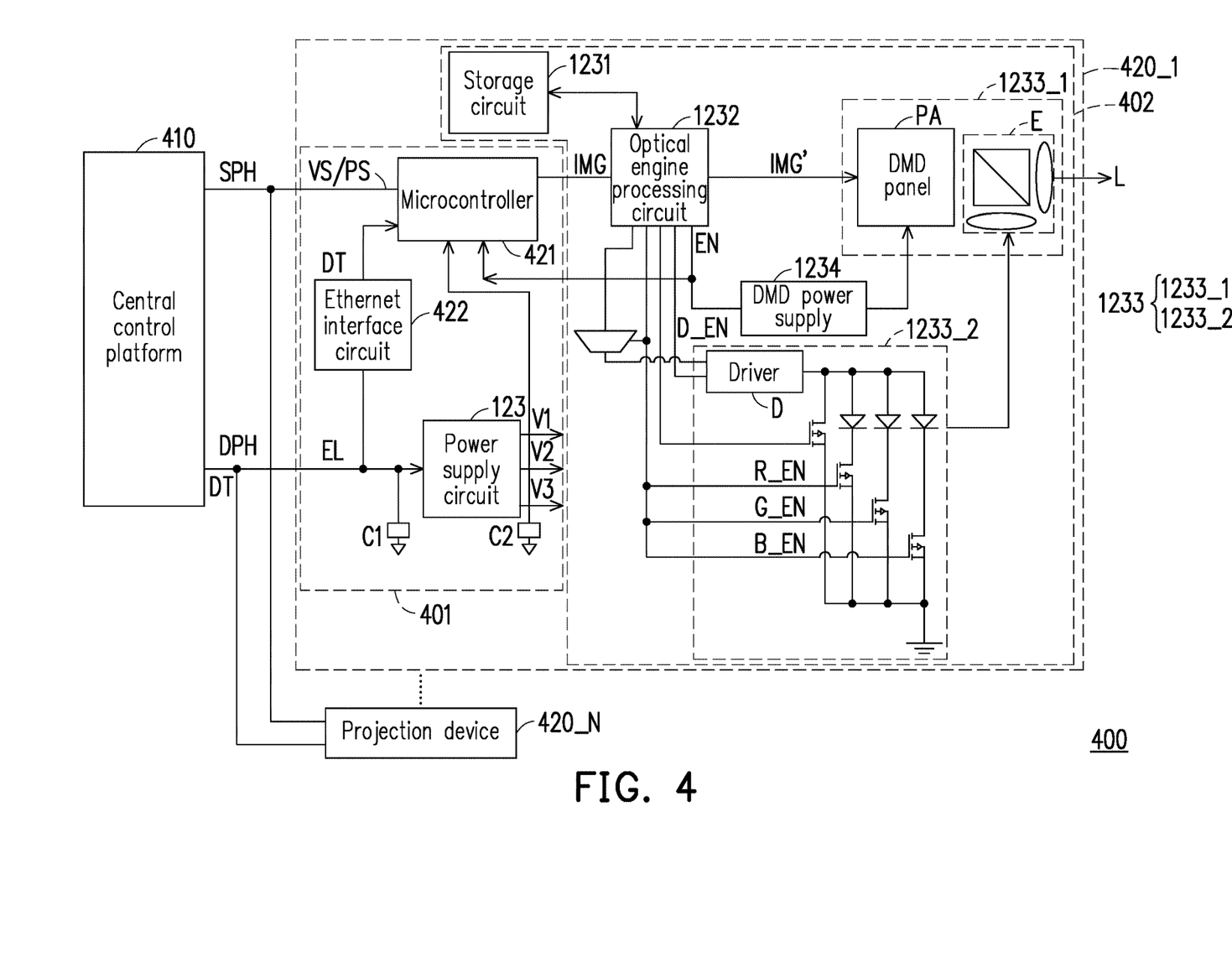
FIG. 4 is a schematic diagram of a circuit block of a projection system according to another embodiment of the invention.

FIG. 4 is a schematic diagram of a circuit block of the projection system 400 according to another embodiment of the invention. In the embodiment shown in FIG. 4, the projection system 400 includes a central control platform 410 and projection devices 420_1, . . . , 420_N. The central control platform 410 may deliver a data signal to the projection devices 420_1 to 420_N through the data signal path DPH, and the central control platform 410 may deliver a selection signal to the projection devices 420_1 to 420_N through the selection signal path SPH. The central control platform 410, the projection devices 420_1 to 420_N, a processing circuit 401, an optical engine module 402, the data signal path DPH, and the selection signal path SPH shown in FIG. 4 may be deduced with reference to the related descriptions of the central control platform 310, the projection devices 320_1 to 320_N, the processing circuit 301, the optical engine module 302, the data signal path DPH, and the selection signal path SPH shown in FIG. 3. This embodiment is different from the embodiment shown in FIG. 3 in that the data signal path DPH shown in FIG. 4 may include an Ethernet line EL, and the central control platform 410 may deliver the data signal DT to the processing circuit 401 through the Ethernet line EL. Other projection devices of the projection system 400 may be deduced with reference to the relevant description of the projection device 420_1, so details thereof will not repeat herein.

In the embodiment shown in FIG. 4, the processing circuit 401 may further include an Ethernet interface circuit 422. The Ethernet interface circuit 422 may be coupled to the Ethernet line EL and a microcontroller 421. The Ethernet interface circuit 422 may decode the data signal DT from Ethernet line EL. The microcontroller 421 is coupled to the Ethernet interface circuit 422 to receive the data signal DT. In this way, when the central control platform 410 selects the projection device 420_1 according to the selection signal of the selection signal path SPH, the microcontroller 421 may generate at least one image frame IMG according to the data signal DT output by the Ethernet interface 422 and transmit the at least one image frame IMG to the optical engine module 402. When the central control platform 410 does not select the projection device 420_1, the microcontroller 421 may ignore the data signal DT, so that the projection device 420_1 does not change the current projection content and/or the projection device control parameters.

In summary, the embodiment of the invention at least has one of the following advantages or functions. In the projection system described in the embodiments of the invention, the central control platform may deliver a data signal to a plurality of projection devices through a same data signal path. In addition, the central control platform may select one or more of the projection devices as one or more selected projection devices according to the signal features of the selection signal of the selection signal path. The one or more selected projection devices may receive and process the data signal delivered by the data signal path, while the other projection devices that are not selected may ignore the data signal. In this way, the central control platform may realize a one-to-many communication mechanism to control a plurality of projection devices.

The foregoing only shows the exemplary embodiments of the invention, and shall not limit the scope of implementation of the invention. That is, all simple and equivalent changes and modifications made in accordance with the claims and the content of the specification of the invention are still within the scope covered by the invention. In addition, the technical solution of any embodiment or claim of the invention does not need to achieve all the objectives or advantages or features disclosed in the invention. In addition, the abstract and title are only used to assist the search of patent documents, not to limit the claim scope of the invention. In addition, the terms "first" and "second" mentioned in this specification or the claims are only used to name the elements or to distinguish between different embodiments or scopes, and are not used to limit the upper or lower limit of the number of elements.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, wherein the projection system comprises:
a plurality of projection devices; and
a central control platform, coupled to the plurality of projection devices, wherein the central control platform is configured to deliver a data signal and a selection signal to each of the plurality of projection devices, each of the plurality of projection devices is configured to generate a decoding result according to the selection signal, and at least one projection device of the plurality of projection devices is selected to receive the data signal delivered from the central control platform according to the decoding result of the at least one projection device being selected, so that the at least one projection device being selected generates a projection image corresponding to the data signal,
wherein the selection signal comprises an analog voltage, or at least one pulse signal.

2. The projection system according to claim 1, wherein any one of the plurality of the projection devices comprises:
a processing circuit, wherein when the central control platform is configured to select the at least one projection device from the plurality of projection devices according to the selection signal, the corresponding processing circuit generates at least one image frame according to the data signal; and
an optical engine module, coupled to the processing circuit, wherein the optical engine module generates the projection image according to the at least one image frame.

3. The projection system according to claim 2, wherein the projection system further comprises:
a power line, adapted for transmitting the data signal, wherein the processing circuit comprises:
a power line communication circuit, coupled to the power line, adapted for decoding the data signal from the power line; and
a microcontroller, coupled to the power line communication circuit to receive the data signal, wherein when the central control platform selects the at least one projection device from the plurality of projection devices according to the selection signal, the corresponding microcontroller is configured to generate the at least one image frame according to the data signal output by the power line communication circuit and transmits the at least one image frame to the optical engine module.

4. The projection system according to claim 2, wherein the projection system further comprises:
an Ethernet line, wherein the processing circuit comprises:
an Ethernet interface circuit, coupled to the Ethernet line, adapted for decoding the data signal from the Ethernet line; and
a microcontroller, coupled to the Ethernet interface circuit to receive the data signal, wherein when the central control platform is configured to select the at least one projection device from the plurality of projection devices according to the selection signal, the corresponding microcontroller generates the at least one image frame according to the data signal output by the Ethernet interface circuit and transmits the at least one image frame to the optical engine module.

5. The projection system according to claim 1, wherein the data signal comprises image content or projection device control parameters.

6. The projection system according to claim 1, wherein when the selection signal comprises the analog voltage, each of a plurality of levels of the analog voltage respectively corresponds to each of the plurality of projection devices.

7. The projection system according to claim 1, wherein when the selection signal comprises the at least one pulse signal, and a number of the at least one pulse signal is one, a pulse width of the pulse signal corresponds to at least one of the plurality of projection devices.

8. The projection system according to claim 1, wherein when the selection signal comprises the at least one pulse signal, a number of pulses of the at least one pulse signal corresponds to at least one of the plurality of projection devices.

9. An operation method of a projection system, wherein the projection system comprises a plurality of projection devices and a central control platform coupled to the plurality of projection devices, wherein the operation method comprises:
delivering a data signal and a selection signal to each of the plurality of projection devices by the central control platform;
generating a decoding result by each of the plurality of projection devices according to the selection signal; and
selecting at least one projection device from each of the plurality of projection devices to receive the data signal delivered from the central control platform according to the decoding result of the at least one projection device being selected, so that the at least one projection device being selected in the plurality of projection devices generates a projection image corresponding to the data signal,
wherein the selection signal comprises an analog voltage, or at least one pulse signal.

10. The operation method according to claim 9, wherein the operation method further comprises:
when the central control platform selects the at least one projection device from the plurality of projection devices according to the selection signal, generating at least one image frame by a processing circuit of the at least one projection device selected from the plurality of projection devices according to the data signal; and
generating the projection image by an optical engine module of the at least one projection device selected from the plurality of projection devices according to the at least one image frame.

11. The operation method according to claim 10, wherein the projection system further comprises a power line adapted for transmitting the data signal, and the operation method further comprises:
decoding the data signal from the power line by a power line communication circuit of the processing circuit; and
when the central control platform selects the at least one projection device from the plurality of projection devices according to the selection signal, generating the at least one image frame according to the data signal output by the power line communication circuit and transmitting the at least one image frame to the optical engine module by a microcontroller of the processing circuit.

12. The operation method according to claim 10, wherein the projection system further comprises an Ethernet line, and the operation method further comprises:
- decoding the data signal from the Ethernet line by an Ethernet interface circuit of the processing circuit; and
- when the central control platform selects the at least one projection device from the plurality of projection devices according to the selection signal, generating the at least one image frame according to the data signal output by the Ethernet interface circuit and transmitting the at least one image frame to the optical engine module by a microcontroller of the processing circuit.

13. The operation method according to claim 9, wherein the data signal comprises image content or projection device control parameters.

14. The operation method according to claim 9, wherein when the selection signal comprises the analog voltage, each of a plurality of levels of the analog voltage respectively corresponds to each of the plurality of projection devices.

15. The operation method according to claim 9, wherein when the selection signal comprises the at least one pulse signal, and a number of the at least one pulse signal is one, a pulse width of the pulse signal corresponds to at least one of the plurality of projection devices.

16. The operation method according to claim 9, wherein when the selection signal comprises the at least one pulse signal, a number of pulses of the at least one pulse signal corresponds to at least one projection device of the plurality of projection devices.

* * * * *